United States Patent [19]

Muller

[11] Patent Number: 4,984,152
[45] Date of Patent: Jan. 8, 1991

[54] SYSTEM FOR CONTROLLING COMPUTER PROCESSING UTILIZING A MULTIFUNCTIONAL CURSOR WITH DECOUPLING OF POINTER AND IMAGE FUNCTIONALITIES IN SPACE AND TIME

[75] Inventor: Michael J. Muller, Highland Park, N.J.

[73] Assignee: Bell Communications Research, Inc., Livingston, N.J.

[21] Appl. No.: 106,587

[22] Filed: Oct. 6, 1987

[51] Int. Cl.$^5$ .......................... G06F 3/02; G06F 3/033
[52] U.S. Cl. ................................... 364/200; 364/236.8; 364/234; 364/286; 364/286.1; 364/286.2; 340/709
[58] Field of Search .................. 364/200 MS, 900 MS, 364/709; 340/723, 721, 709, 724, 710

[56] References Cited

U.S. PATENT DOCUMENTS

| | | | |
|---|---|---|---|
| 4,070,710 | 1/1978 | Sukonick | 340/724 |
| 4,455,619 | 6/1984 | Masui | 364/900 |
| 4,546,435 | 10/1985 | Herbert | 364/300 |
| 4,555,772 | 11/1985 | Stephens | 364/900 |
| 4,648,046 | 3/1987 | Copenhauer | 340/709 |
| 4,656,603 | 4/1987 | Dunn | 364/900 |
| 4,667,233 | 5/1987 | Furukawa | 358/105 |
| 4,689,616 | 8/1987 | Goude | 340/724 |
| 4,698,624 | 10/1987 | Barker et al. | 340/709 |
| 4,716,533 | 12/1987 | Ohmori | 340/724 |
| 4,739,314 | 4/1988 | McCaskill | 340/709 |
| 4,752,889 | 6/1988 | Rappaport | 364/513 |
| 4,755,808 | 7/1988 | Bullock | 340/709 |
| 4,772,882 | 9/1988 | Mical | 340/709 |
| 4,816,812 | 3/1989 | Iida | 340/724 |
| 4,821,029 | 4/1989 | Logan | 340/721 |
| 4,841,291 | 6/1989 | Suix | 340/724 |
| 4,859,995 | 8/1989 | Hansen | 340/723 |
| 4,897,636 | 1/1990 | Nishi | 340/724 |

OTHER PUBLICATIONS

"Corporate Identity for Iconic Interface Design: The Graphic Design Perspective", Computer Graphics and Applications, vol. 4, Issue 12, Aaron Marcus.

"Experiences with the Alternate Reality Kit. An Example of the Tension Between Literalism and Magic", Randall B. Smith, Conference Proceedings–Human Factors in Computing Systems and Graphics Interface, pp. 61–67.

*Primary Examiner*—David Y. Eng
*Assistant Examiner*—Eric Coleman
*Attorney, Agent, or Firm*—John T. Peoples

[57] ABSTRACT

A human-computer interface for executing computer operations on data objects under control of a multifunctional cursor which represents multiple computer operations visually in the cursor, which facilitates execution of repeated operations through a "cycle" capability, and which decouples pointer and image functionalities in time and space.

The interface may be configured with a screen display and a movable region to display a cursor shape, which shape contains multiple icons representative of computer operations. Each computer operation may be executed under the control of a distinct input pattern. Multiple operations may be loaded in one or more sequences, which may themselves by cycled under control of a distinct input pattern.

The interface may also be configured with a screen display, a movable region to display a cursor pointer, and an image region to display computer operation icons. One operation from a menu of operations is associated with the image subarea, and then an icon representative of the associated operation is displayed in the image subarea as a local reminder of this operation. The associated operation may then be executed on a data object on the screen when prompted by the user. The image subarea may be subdivided so that multiple operations may be loaded, displayed, and then executed through cursor control. The pointer subarea and the image subarea are decoupled from one another in time and in space. The visibility of the image subarea is decoupled from the availability of operations indicated within that subarea.

5 Claims, 22 Drawing Sheets

SYSTEM FOR CONTROLLING COMPUTER PROCESSING UTILIZING A MULTIFUNCTIONAL CURSOR WITH DECOUPLING OF POINTER AND IMAGE FUNCTIONALITIES IN SPACE AND TIME

FIELD OF THE INVENTION

This invention relates generally to computer/user interfaces, and, more particularly, to a computer methodology and associated circuitry for executing computer operations on data objects under control of a cursor which includes a pointer functionality and an image functionality.

BACKGROUND OF THE INVENTION

In many applications involving access to and control of a computer system through a workstation interface, the user moves a cursor around the associated workstation screen by physically moving a hand-held device called a "mouse" across a flat surface. The user triggers certain events by pressing a button on the mouse; this action is often referred to as "clicking" the mouse. In general, each mouse-clicked event is associated with one data object, such as a data file, out of the many objects displayed on the screen. The object selected is the one pointed at by the cursor.

Simple, mouse-driven interfaces have been exploited in numerous commercial systems. The mouse in these systems typically has a single button. The repertoire of mouse-clicked operations is somewhat small. These operations include, for example: (1) selecting a data object in preparation for performing an operation on that object; (2) opening a data object (e.g., editing a file); and (3) "dragging" an object to a new location on the screen. The key characteristic of this user interface is that it is easily learned, often without the need for extensive reading of manuals or formal training. However, this style of user interface has limitations: (1) there are very few functions immediately available within a single mouse click; and (2) as a result, routine, repeated operations are laborious to perform.

Other commercial systems, particularly those serving the artificial intelligence (AI) community, use more sophisticated mouse-driven interfaces. Typically, a mouse in these systems has multiple buttons, with each button having a different function. In some applications involving a mouse with more than one button, the user triggers certain events by pressing multiple buttons on the mouse simultaneously; this action may be referred to as "chording" the mouse. Single-button "clicks" (as described above) are degenerate cases of "chords"—i.e., they are chords in which only a single button is pressed.

In these interfaces, the functions associated with the one or more buttons change depending upon the state of the computer system. Sometimes there is no information presented visually to the user concerning the change in function of the buttons. In other systems, the functions for each button are indicated by a legend line or "mouse line" which is typically located in a region of the screen disassociated from the cursor location. The user is often unaware of changes in function because the legend line has been unobtrusively rewritten.

Several systems modify the appearance of the cursor to indicate the different functional states of the system. Typical default cursor shapes are shown in FIGS. 1 and 2. These may be replaced by other shapes or icons representative of the current computer functionality. However, this leads potentially to the problem of conflict between two desirable cursor functionalities: the need to represent a computer operation through a displayed icon, and the need to select unambiguously a single data object as the target of that computer operation. As shown by the tiny circled cross-hairs (or "hot spots") which have been superimposed in FIGS. 3 and 4, the default cursor shapes of FIGS. 1 and 2 provide unambiguous pointer functionality. The same cannot be said of many operation icons that might be substituted for the default shapes. The result of this problem is that certain cursor shapes with high information content cannot be used because they are ambiguous pointers. Certain other cursor shapes with low information content are used repeatedly to represent more than one computer operation, because they make good pointers. This generally leads to a corresponding ambiguity as to which operation is currently active or available.

AI environments often increase the functionality of the cursor through the use of pop-up menus. One mouse button —typically the left button—is reserved as a "select" button. Other mouse buttons are used to signal the computer system to display a temporary menu (i.e., a pop-up menu) of possible operations. The mouse is then moved over the pop-up menu until it is positioned on the desired operation. The "select" button is used to invoke the desired operation. A succession or "cascade" of popup menus may be required to complete the selection of the desired operation. When the selection process is complete, all pop-up menus are removed, and the selected operation is performed.

While pop-up menus increase the power of the system, they also have limitations: (1) the available commands are hidden from the user until the pop-up menu is invoked; (2) as a result, the user must explore all possible pop-up menus to understand what functionality is available for the current state of the computer system; and (3) the user who is experienced in the system and who already knows the options of the pop-up menus is nonetheless forced to traverse those menus (i.e., there are no short-cuts obviating pop-up traversal available through the mouse and cursor).

These arrangements make the AI environments suboptimal for several classes of users. The hidden and changeable nature of the operations makes the AI environments difficult to use except by those well-versed in the particulars of a given system. The requirement of pop-up menu traversal imposes extra, unnecessary steps upon experienced users who no longer need the reminder/prompter function of the pop-up menus.

Today, system developers are designing more and more powerful systems and tools, and they are doing so within an AI-like framework. There is a need to have this technology utilized by users not educated in the subtleties of computer science or artificial intelligence. What is required is an interface arrangement and method that transforms display and operational processes into a less imposing, more user-friendly environment without sacrificing the AI-like capabilities. There is a concomitant need to retain the speed and power of the AI-like environment for experienced users.

An arrangement describing the trend towards the desired interface arrangement is disclosed in the paper "Corporate Identity for Iconic Interface Design: The Graphic Design Perspective," authored by A. Marcus and appearing in *IEEE Computer Graphics and Applications* vol. 4, issue 12, Dec. 1984, pp. 24–32. This paper shows several cursor shapes, each of which includes a frame into which an icon can be overlaid, and a pointer functionality which is used to select a data object as the target of the computer operation whose icon is displayed in the frame. FIG. 5 shows an empty frame; FIG. 6 shows a frame with a computer operation icon overlaid within it (FIGS. 5 and 6 are redrawn from the A. Marcus paper, at a 16×16 resolution for compatibility with the present invention, rather than the 64×64 resolution of the original paper). The paper shows two different frames, which are used within the same environment. One of these is a square frame with a pointer attached to it, as shown in FIG. 5. The other is simply a square (FIG. 7) whose upper left corner serves by convention as the implicit pointer of the cursor. Hot spots for these cursor shapes are shown in FIGS. 8 and 9.

This is an improvement, in that it reduces the cognitive load upon the user. The current computer operation which has been loaded into the cursor is iconically displayed as a constant reminder of that operation. The icon of the computer operation itself is not required to serve as a pointer, because it is overlaid within the frame of the cursor. The frame of the cursor provides the pointer functionality. However, the technique is limited to a single computer operation at a time: only one icon can be made visible within the frame at any moment. This limitation contributes to some of the problems described above. Some commands remain invisible to the naive user, hidden within pop-up menus which are activated by multiple mouse buttons. The use of two different pointer frames (i.e., FIG. 5 and FIG. 7)—one with an implicit pointer functionality—in the same user interface contributes to user confusion, the opposite of the desired goal.

A second aspect of the trend toward the desired interface arrangement is disclosed in the paper "Experiences with The Alternate Reality Kit—An Example of the Tension Between Literalism and Magic," authored by R. B. Smith and appearing in the *Proceedings of CHI+GI* (Toronto, April 5-9), ACM, New York, 1987, pp. 61-67. This paper describes an animated environment for creating interactive simulations. Users of the environment manipulate objects with a mouse-operated "hand" which enables the user to simulate the carrying or throwing of objects, the pressing of buttons, and the operating of sliding mechanisms on the workscreen. The hand can be made to pick up a tool and to carry that tool to an object which is its target, where the hand can then activate the tool by pressing a button which is displayed on the tool icon.

Replacement of the cursor with the hand icon and the provision of additional types of operations traditionally performed by the human hand imparts an added sense of dimensionality and user friendliness to the usual cursor control technique. However, this technique does have its shortcomings in that the functionality of the arrangement is described in terms of operations or activities performed by the human hand. Only one tool can be used at any particular moment. Tools in the Alternate Reality Kit environment are blunt rectangular objects rather than precise pointers, and are therefore incapable of directing their activity to a narrowly-defined area or data object.

Furthermore, under both the Alternate Reality Kit and the work by A. Marcus, the tool icon is continuously displayed. This has costs in terms of display complexity: For many-button or many-protocol mice, a large and detailed cursor shape must be moved about the display, obstructing the user's view of the data objects. The technique also has costs in terms of operational overhead: The continuous movement of large cursor displays requires non-trivial computing resources.

SUMMARY OF THE INVENTION

The above-described problems and other shortcomings and limitations of cursor-controlled computer systems are obviated, in accordance with the principles of the present invention, by utilizing a multifunctional cursor wherein a set of icons defines multiple functions which are simultaneously available in the cursor, and wherein a display of currently available operations or other useful information is presented on the screen in a manner which, broadly, decouples pointer and information visibility in terms of space, time, and availability.

According to the preferred embodiment of the present invention, there are as many icons in the cursor area as there are combinations of buttons (chords) on the mouse of the interface device. Icons occur within the image region of the cursor (as opposed to the pointer region of the cursor); multiple images appear each in its own image subregion. When functions are changed, the icons of the corresponding chords are changed. In this manner, the functionality of each button is clearly indicated in the cursor shape. Once the functions are loaded into the cursor, they may be executed on a data object appearing on the screen area. A plurality of operations may be loaded into different chords and these operations may be performed at will on a given data object through entering the correct chords, without further recourse to the menu of operations. Moreover, a sequence of operations may be loaded into the multifunctional cursor and these operations may be performed sequentially on a given data object without further recourse to the menu of operations.

The decoupled nature of the multifunctional cursor separates several aspects of cursor functionality which have thus far been confounded. First, the pointer functionality and the image functionality are decoupled in time: the pointer is always visible, but the image appears only under certain specifiable conditions. Second, the pointer functionality and the image functionality are decoupled in space: while they occur in adjacent areas of the screen, they may occur in any relative spatial positions. Third, the functionality accessed through the cursor is decoupled from the visibility of the image: by inputing the correct chord, the user can access the desired computer operation whether or not the image is currently displayed.

Decoupling in time is important from the perspective of reducing display complexity; of reducing computer resources allocation to display update and maintenance; and of providing an easily modified parameter for adaptive user interface procedures.

Decoupling in space is important to insure the visibility of complex information displays.

Decoupling of accessibility and visibility is important to insure that the user interface can be operated to advantage by both inexperienced and expert users.

The decoupling in space and time is similar to pop-up menus, with these important differences: (1) No mouse operation is required to produce the image region under this invention, whereas a specific mouse operation is required to produce a pop-up menu. (2) Under this invention, the image region appears after an assignable delay period, whereas a pop-up menu will not appear unless invoked by the user through the mouse operation. Under this invention, inexperienced users who do nothing in confusion will be prompted with the image region; by contrast, inexperienced users will wait forever to be prompted by a pop-up menu. (3) Under this invention, the delay period can be treated as a parameter to be set by adaptive user interface software,—e.g., to provide quicker prompting information (a) following errors or (b) for inexperienced users; no such user-adaptive mechanism is available with pop-up menus. (4) More mouse input patterns (clicks and chords) are available under this invention for user-selectable computer operations, because no mouse input patterns must be reserved for pop-up menu invocation. (5) Under this invention, experienced users can bypass the image region by chording the required mouse input pattern before the image region is displayed; there is no corresponding way to bypass pop-up menus.

The organization and operation of this invention will be better understood from a consideration of the detailed description of the illustrative embodiments thereof, which follow, when taken in conjunction with the accompanying drawing.

DETAILED DESCRIPTION

Initially, it is instructive to provide an overview discussion before presenting the particulars of the underlying methodology. This also serves the purpose of introducing terminology.

Figure 1:
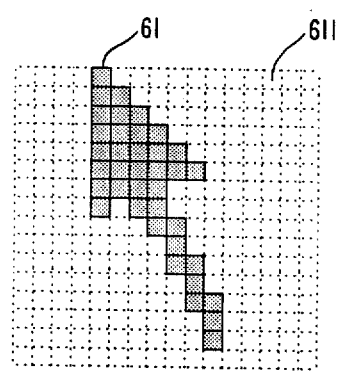
FIG. 1 depicts a conventional pointing arrow cursor.
Figure 2:
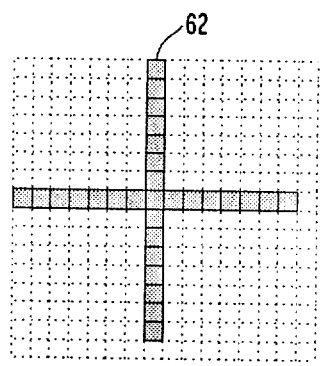
FIG. 2 depicts a conventional cross-hair cursor.

In a typical single button, mouse-driven interface to a computer system, the movement of the mouse controls a single cursor on a graphical display device portion of the system; typical cursor shapes are the pointing arrow 61 and the cross-hair 62 of FIGS. 1 and 2, respectively. As depicted in FIG. 1, the pointing arrow 61 is shown overlaid on a 16×16 grid—a typical cursor size for mouse-driven interfaces. Each grid box 611 represents a pixel from a terminal screen display. Since a typical display device has a full screen display area defined by thousands of pixels, the 16×16 grid is but a small subarea of the full screen area. Because of the integration ability of the human visual system, the pointing arrow 61 does not appear as a composite of pixels to the naked eye when viewed on the full screen area. However, the granularity is present and the description of the pointing interfaces in accordance with the present invention will include details at the pixel level.

Figure 5:
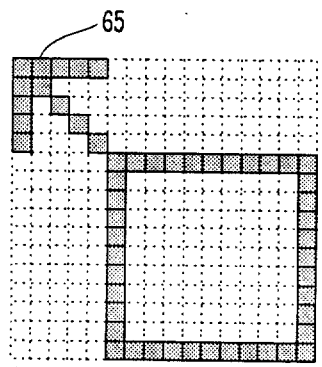
FIG. 5 depicts a conventional single-operation cursor which can display the current computer operation ready to be performed without any operation having as yet been selected.
Figure 6:
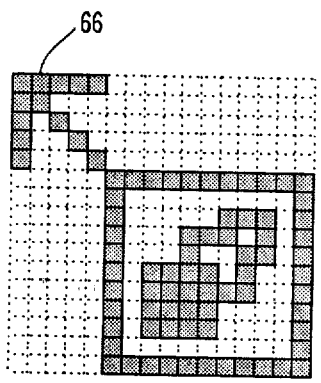
FIG. 6 depicts a conventional single-operation cursor which displays a current computer operation which is ready to be performed.
Figure 7:
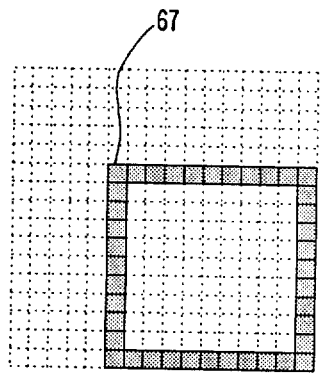
FIG. 7 depicts a conventional alternate form of the single-operation cursor which can display the current computer operation ready to be performed without any operation having as yet been selected.
Figure 10:
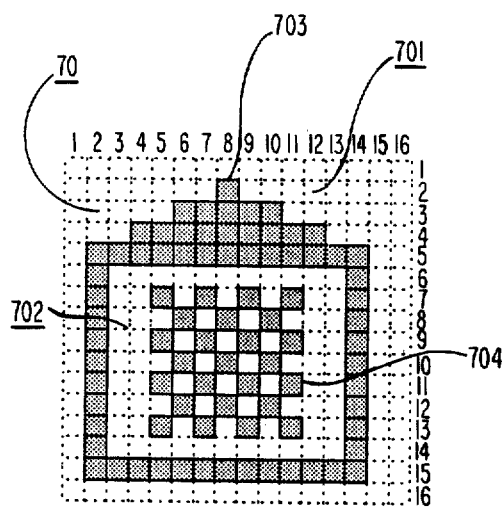
FIG. 10, depicts a variation on the shape of FIG. 5 which is consistent with the present invention, featuring a single pointer subregion and a single image subregion.

FIGS. 5-7 depict conventional cursor shapes 65-67, respectively FIG. 10 depicts a new version of that shape, namely, shape 70, which is consistent with the present invention. The cursor area has been partitioned into two regions, namely a pointer region 701 and an image region 702. Basically, the image region comprises rows 5 through 15 with the pointer region defined by the remaining rows.

Figure 11:
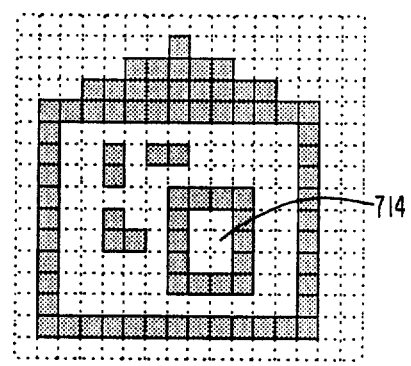
FIG. 11 depicts an example of a loaded or overlaid image icon within the shape of FIG. 10.

In the pointer region 701 a pointer icon 702 has been defined by darkening the pixels appearing in a triangle shape in rows 2-4. The pointer icon 703 has essentially the same pointing directivity as the pointing arrow 61 of FIG. 1. In the image region 702, a 7×7 "checkerboard" icon 704 of alternating light- and dark pixels is shown. This checkered iconn 704 indicates that the image region 702 has not been associated with any computer operation. A computer operation is selected, for example, from a menu of operations by positioning the pointer icon 703 displayed in the pointer region 701 to an item on the menu, and an image icon representative of the computer operation is loaded into the image region 702 by clicking the mouse button. An example of a loaded image, icon is depicted in FIG. 11. In this case, the image icon 714 is composed of two overlapping rectangles, thereby indicating that the particular computer operation selected was the "rename" command. Whenever a different computer operation is selected (this procedure will be discussed shortly), the associated image icon changes accordingly.

Figure 12:
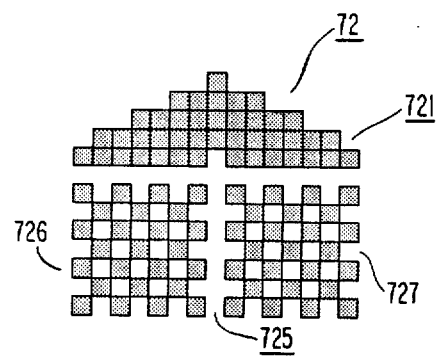
FIG. 12 depicts a cursor shape in accordance with the present invention which can load and display computer operations associated with each of two mouse buttons, featuring a single pointer subregion.
Figure 13:
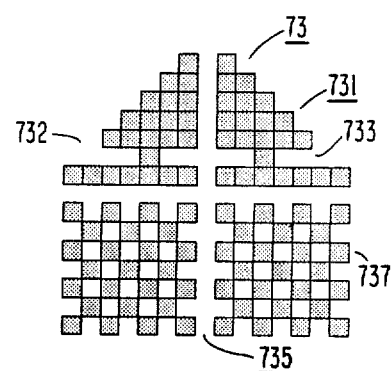
FIG. 13 depicts another cursor shape in accordance with the present invention which can load and display computer operations associated with each of two mouse buttons, featuring a plurality of pointer subregions.

FIG. 12 depicts a new cursor shape 72 illustrating one departure from the art according to the present invention. FIG. 12 shows a display subarea 72 that may be associated with a two-button, mouse-driven interface. The pointer region 721 comprises rows 1-5 and all 16 columns. FIG. 13 depicts an alternative cursor shape 73. The pointer region 731 in FIG. 13, now comprising rows 1-7 and all 16 columns of the 16×16 grid, has been further subdivided into two pointer subregions 732 and 733. The first subregion includes columns 1-8 and the second subregion is defined by columns 9-16. An appropriate pointer icon has been defined for each pointer subregion, namely, arrows 732 and 733; these pointer arrows are basically symmetrical to each other.

The image region of both FIGS. 12 and 13 (725 and 735, respectively) has been further subdivided into two image subregions. The first occupies columns 1-8, and the second columns 9-16; for FIG. 12, the image subregions occupy rows 8-15; for FIG. 13, the image subregions occupy rows 6-13. In FIGS. 12 and 13, each image subregion is shown as a checkerboard grid, thereby indicating that each subregion (726, 727 of FIG. 12 and 736, 737 of FIG. 13) has not yet been associated with a computer operation.

Figure 14:
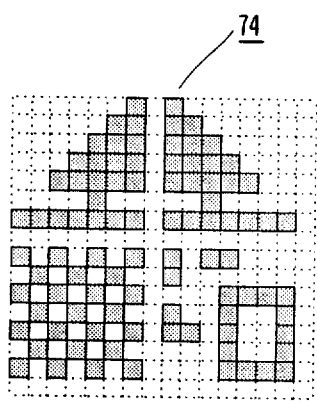
FIG. 14 depicts the cursor shape of FIG. 13 with a "rename" computer operation loaded into the right-hand mouse button and its icon in the corresponding image subregion.
Figure 15:
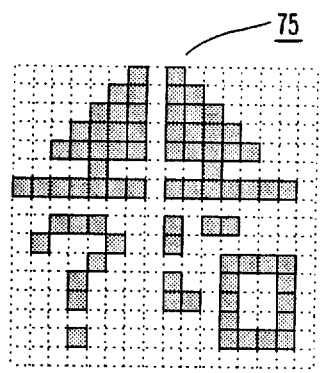
FIG. 15 depicts the cursor shape of FIG. 13 with the "help" computer operation loaded into the left-hand mouse button and its icon in the corresponding image subregion.

FIG. 14 depicts the display subarea 74 after the "rename" computer operation has been selected from the menu by depressing the right button on the mouse once the associated pointer arrow has been positioned on the "rename" icon in the menu of computer operations. To complete the sequence, FIG. 15 depicts the display subarea 75 after the "help" command has been selected by clicking the left button once the associated pointer arrow has been positioned on the "help" icon, that is, the question mark, in the menu of computer operations.

Figure 16:
FIG. 16 depicts a sequence of mouse-clicking operations to load the "edit" and "compile" computer operations from a menu into a two-button mouse.
Figure 16:
Figure 16:
Figure 16:
Figure 16:

To understand how functions are assigned to the mouse buttons and how the assigned functions operate on data objects, reference is now made to FIG. 16. In the illustrative embodiment, a menu of operations is placed on a subarea of the screen. An exemplary menu is shown in column A of FIG. 16 as represented by the corresponding icons. The "help" and "rename" icons, as discussed above, are depicted as part of the repertoire. Also shown in column A, to the right of the menu, is cursor shape 51 discussed above with respect to FIGS. 13, 14, and 15. To select a desired operation, the user moves the cursor over the desired operation and clicks on it. As shown in column B of FIG. 16, the cursor is placed over the "edit" icon, and then the left button is clicked. Column C of FIG. 16 illustrates that the "edit" operation has been loaded and the "edit" icon appears in the left-hand image subregion, now designated as shape 511. Column D of FIG. 16 shows, in addition to the menu, another subarea of the screen in which a number of user files are displayed. When the user moves cursor 511 to a data object and clicks on it, the loaded operation is performed on the data object. For this example, the file "graph1.bas" is to be edited, so the next display on the screen (not shown) is that portion of the "graph1.bas" file displayed by the particular editor configured for the system. Finally, column E of FIG. 16 shows that the state of cursor 51 with the "edit" operation and a "compile" operation loaded into the two-button mouse, now designated as shape 512. These two operations may be performed sequentially on a data object without the need to return to the menu between operations.

It is also noted that the system may load the cursor without user intervention.

Routine, repeated operations are also facilitated by the present invention. It is supposed that the user needed not only the "edit" and "compile" operations, as described above with reference to FIG. 16, but the "link" and "debug" operations as well. These constitute four separate operations which generally would require a four-button mouse. However, in accordance with another aspect of the present invention, these functions (or a larger number of functions) may be loaded unambiguously into a two-button mouse.

Figure 17:
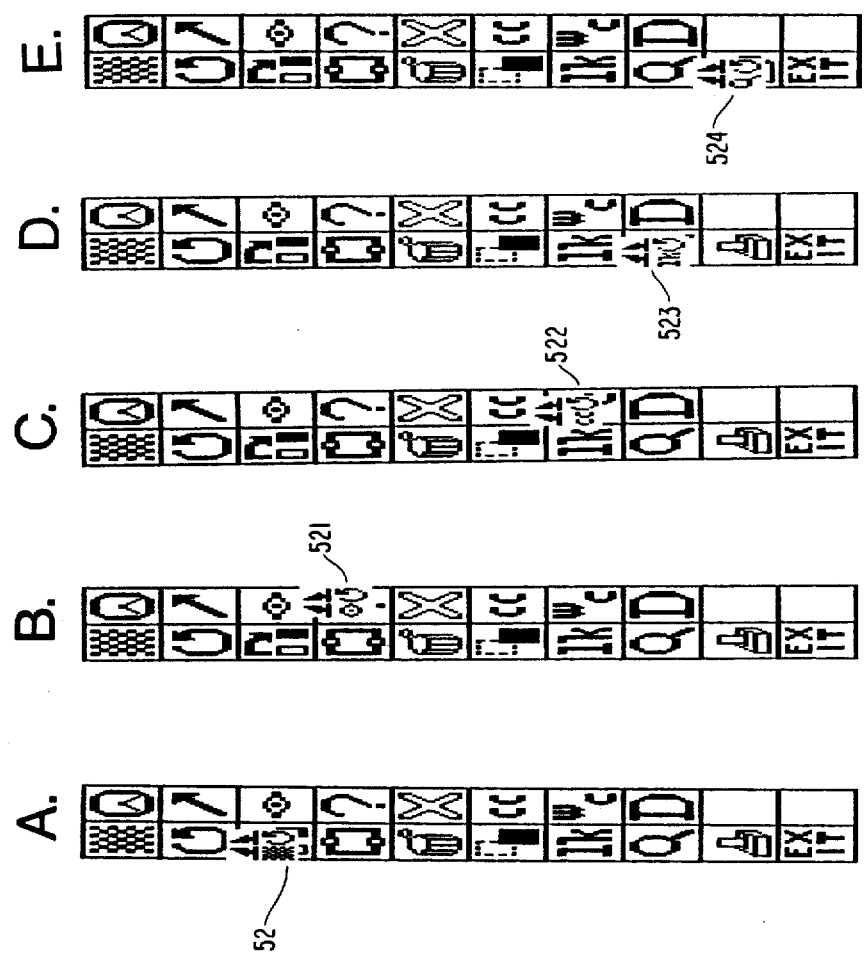
FIG. 17 depicts the loading of the "cycle" operation, as well as the operations composing one such user-selected cycle, from the menu into a two-button mouse.
Figure 18:
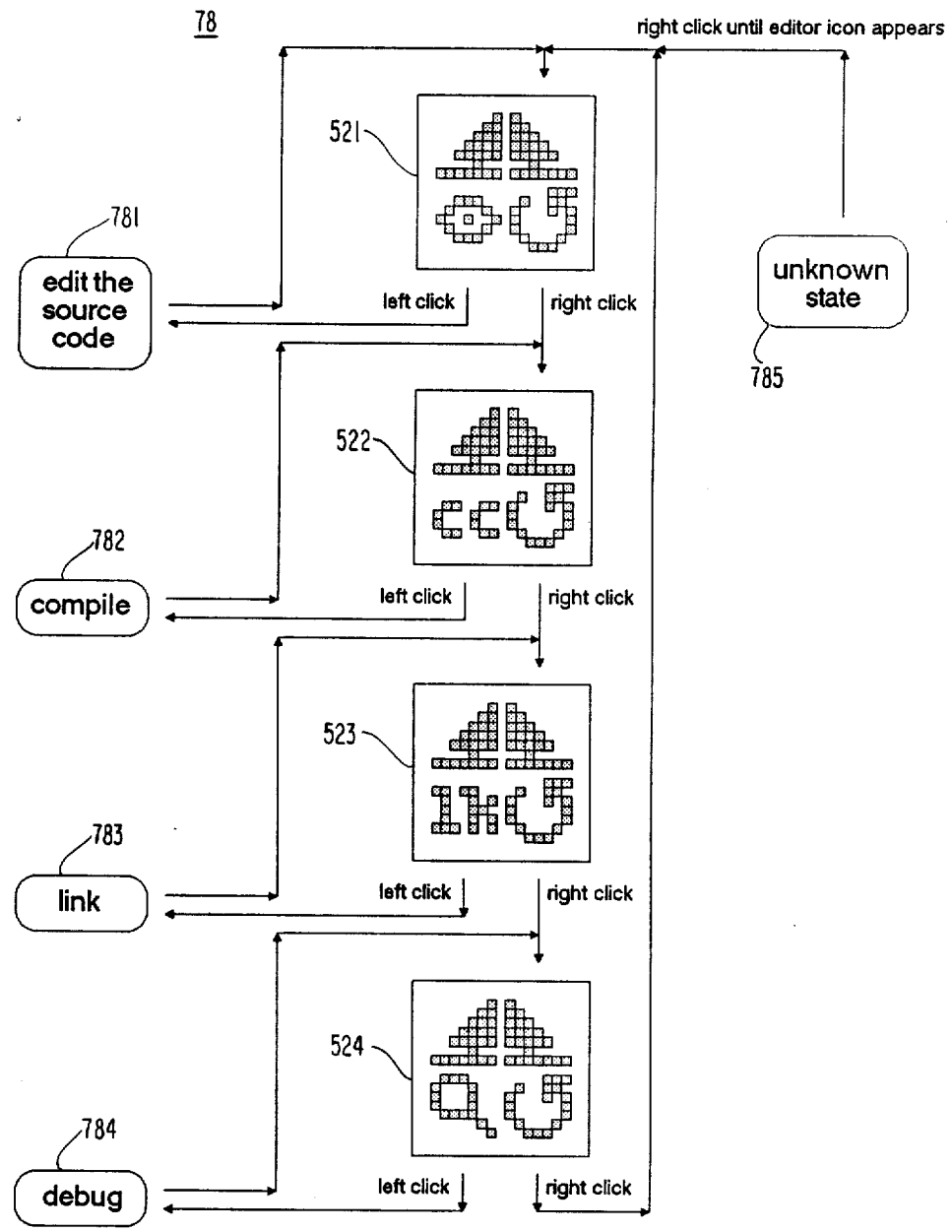
FIG. 18 is a state-transition diagram summarizing the execution of the computer operations loaded with reference to FIG. 17.

A special menu operation, with its associated icon, is provided for "cycling" through loaded computer operations. This icon is displayed as the left-hand icon in row 2 of column A of the illustrative menu subarea of FIG. 17. Cursor 52 is shown as pointing to the "cycle" icon, and the "cycle" operation has already been loaded into the right-hand image subregion of the cursor. The user is now prepared to load the sequence of operations suggested above, namely, "edit," "compile," "link," and "debug." These are loaded sequentially by positioning the cursor over the menu icons and clicking the left-hand button; columns B-E of FIG. 17 depict the loading of the four operations via shapes 521-524, respectively. Now, whenever the cursor is positioned over a data object, the function of the right button is to cycle through the sequence of operations loaded into the left button. The user performs the sequence as follows: (1) edit—click right button until "edit" icon appears in left image subregion, then click left button once to edit the file pointed to by cursor; (2) compile—click once on right button to cycle to the next operation ("compile") on the left button, then click left button once to compile the file; (3) link and debug follow the same pattern as in step (2) above; and (4) edit (again)—click once on the right button to cycle back to the beginning of the sequence on the left button, then click the left button once after pointing to the desired data object, and so forth. A summary of these operations 781-785 is depicted by the state transition diagram 78 of FIG. 18.

The ability to cycle through the functions provides a least two related efficiencies, namely: (i) once the sequence has begun, the sequence is pursued by predictable, single clicks of the right button, and no further recourse to the menu of operations is required; and (ii) if a problem is encountered (e.g., a compiler error), the user may abort the full sequence and return to the editor, again without recourse to the menu of operations.

Figure 3:
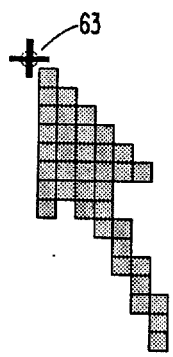
FIG. 3 depicts a conventional pointing arrow cursor with the pointing functionality highlighted by a tiny circled cross-hair.
Figure 4:
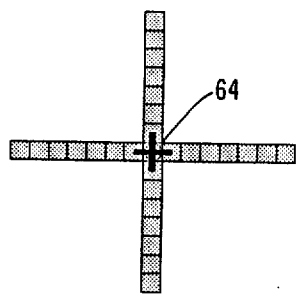
FIG. 4 depicts a conventional cross-hair cursor with the pointing functionality highlighted by a tiny circled cross-hair.
Figure 8:
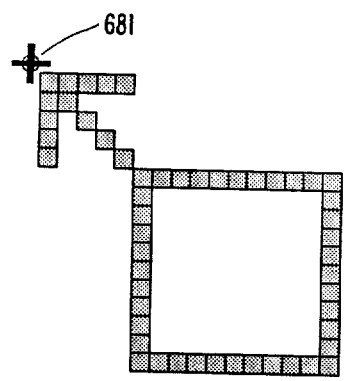
FIG. 8 depicts cursor shape of FIG. 5 with its hot spot indicated.
Figure 9:
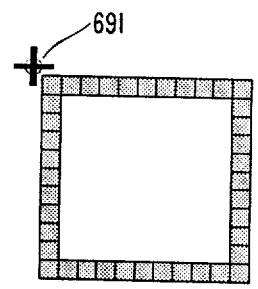
FIG. 9 depicts cursor shape of FIG. 7 with its hot spot indicated.
Figure 19:
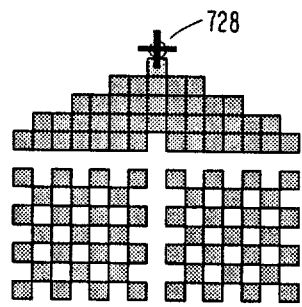
FIG. 19 depicts a two-button cursor shape with a single pointer subregion with its hot spot indicated by a tiny, circled cross-hair.
Figure 20:
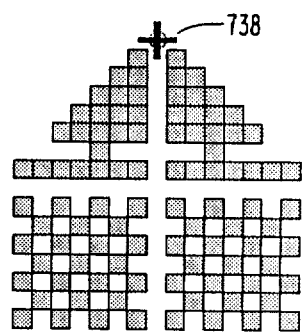
FIG. 20 depicts a two-button cursor shape with a plurality of pointer subregions with its hot spot indicated by a tiny, circled cross-hair.

It is important at this juncture, before presenting other cursor shapes and the operating characteristics, to focus on cursor designs, particularly pointer region patterns. The conventional designs of FIGS. 1 and 2 inherently act as pointers. The point of the arrow or the center of the cross-hair is defined by system software as the hot spot of the cursor—that is, whatever data object is under the hot spot is the one which receives the action of the mouse click. The hot spot for the two cursor shapes of FIGS. 1 and 2 are shown as tiny, circled crosshairs 63 and 64 in FIGS. 3 and 4, respectively. (Hot spots 681 and 691 in FIGS. 8 and 9, respectively, are shown for the cursors of FIGS. 5 and 7, respectively.) With multifunctional cursor shapes, the pointer images are configured so that all the icons appear under a single pointer or under multiple pointers which point unambiguously to the same hot spot, as depicted by reference numerals 728 and 738 in FIGS. 19 and 20 for the two two-button cursor shapes which have been discussed thus far (i.e., those shapes in FIGS. 12 and 13). Other designs are possible in which multiple pointers within a single cursor shape point to multiple, distinct, and unambiguous hot spots.

Figure 21:
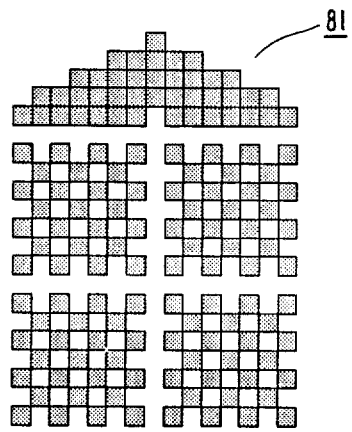
FIG. 21 depicts a two-button cursor shape with a single pointer subregion and with a second tier of image subregions corresponding to rapid double-click mouse button inputs.
Figure 23:
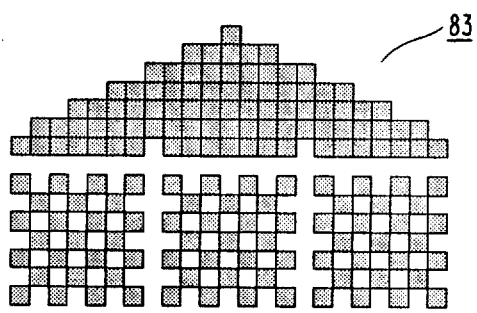
FIG. 23 depicts a three-button cursor shape with a single pointer subregion.
Figure 25:
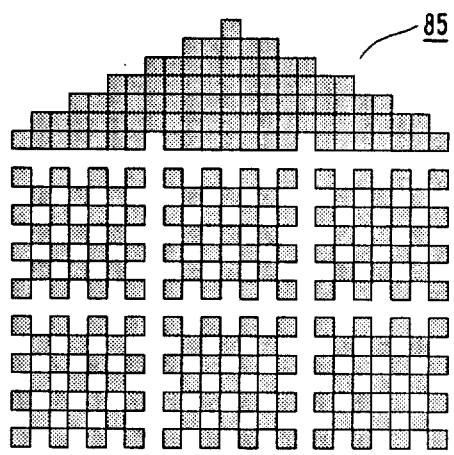
FIG. 25 depicts a three-button cursor shape with a single pointer subregion and with a second tier of image subregions corresponding to rapid double-click mouse button inputs.
Figure 22:
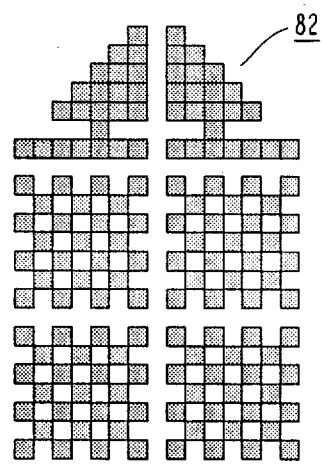
FIG. 22 depicts a two-button cursor shape with a plurality of pointer subregions and with a second tier of icon image subregions corresponding to rapid double-click mouse button inputs.
Figure 24:
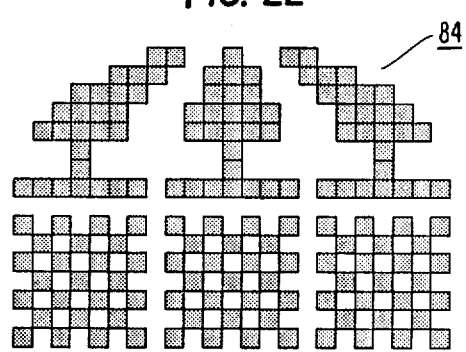
FIG. 24 depicts a three-button cursor shape with a plurality of pointer subregions.
Figure 26:
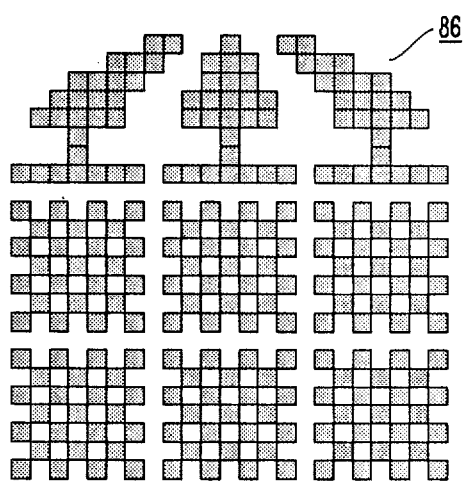
FIG. 26 depicts a three-button cursor shape with a plurality of pointer subregions and with a second tier of icon image subregions corresponding to rapid double-click mouse button inputs.

The cursor shapes 72 and 73 of FIGS. 12 and 13 are extensible to more complex mice and to more complex protocols. Many mouse-driven interfaces differentiate between single-clicks and rapid double-clicks on the same button. This distinction may be used in structuring twotiered cursor shapes. Two such shapes 81 and 82 are shown in FIGS. 21 and 22, which depict extensions of the two-button mouse cursor shapes to include a second tier having two additional image icon subregions. FIGS. 23 and 24 show illustrative cursor shapes 83 and 84 for a three-button mouse, and FIGS. 25 and 26 show extensions of these cursor shapes to a second tier, namely, cursor shapes 85 and 86, respectively.

More complex cursor shapes may be required to accommodate more complex button-clicking protocols. One example is the representation of chording protocols on a three-button mouse. In accord with the present invention, such a representation indicates the computer operations associated with three single-button "chords," with three two-button chords, and with one three-button chord. Extension of the these principles leads to still new cursor shapes, and to new cursor functionality which decouples the pointing functionality from the image representation functionality in space, time, and availability.

Figure 27:
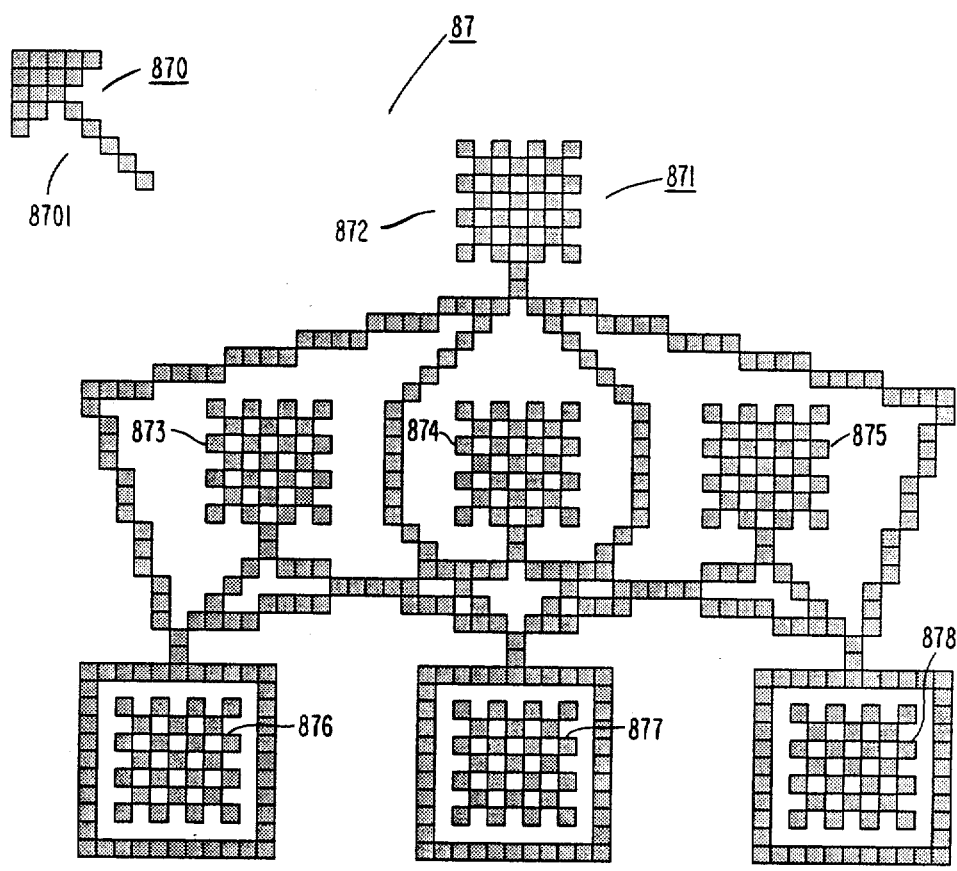
FIG. 27 depicts a cursor design for a threebutton chording mouse, with decoupled pointer and image regions, in accordance with the present invention.

FIG. 27 depicts a cursor 87 appropriate to a chording three-button mouse. The pointer region 870 comprises a small area—not larger than the 16×16 grids of FIGS. 1 and 2. The pointer icon 8701 as essentially the same pointing functionality and directivity as in FIGS. 1 and 2.

The image region 873 is much larger. The image region has essentially the same representation and execution functionality as described in the preceding material about two-button and three-button non-chording mouse interfaces. Each checkerboard icon 872-878 in FIG. 27 may be overlaid with an icon representing a computer operation. Each such icon is accessed through a different chord of mouse-button depressions. The illustration of FIG. 27 assumes a three-button mouse. The lowest row of icons 876-878 is associated with single-button chords. The lowest left icon 876 corresponds to the left mouse button (chord "L" in this discussion). The lowest right icon 878 corresponds to the right mouse button ("R"). The middle bottom icon 877 corresponds to the middle mouse button ("M"). The middle row of icons 873-875 corresponds to two-button chords. The leftmost icon 873 of the middle row is accessed by simultaneously depressing the left and middle mouse buttons ("LM"). The rightmost icon 875 of the middle row is accessed by simultaneously depressing the middle and right mouse buttons ("MR"). The middle icon 874 of the middle row is accessed by simultaneously depressing the left and right mouse buttons ("LR"). Finally, the single icon 872 in the top row of the image is accessed through a threebutton chord by simultaneously depressing all three mouse buttons ("LMR").

Figure 28:
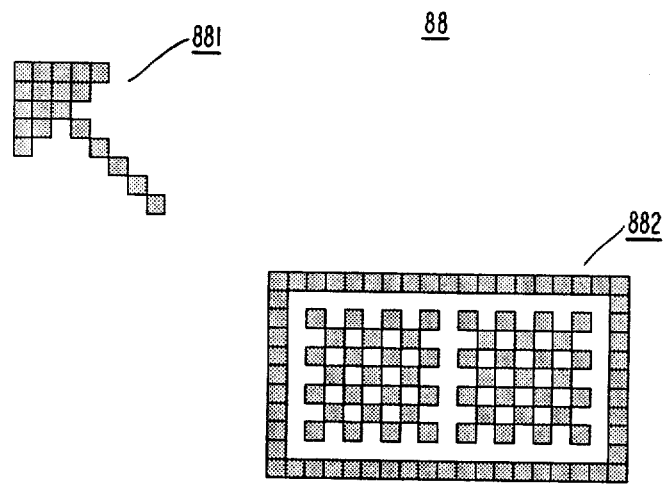
FIG. 28 depicts a cursor design for a two-button mouse without chording or double-clicking, with decoupled pointer and image regions, in accordance with the present invention.
Figure 29:
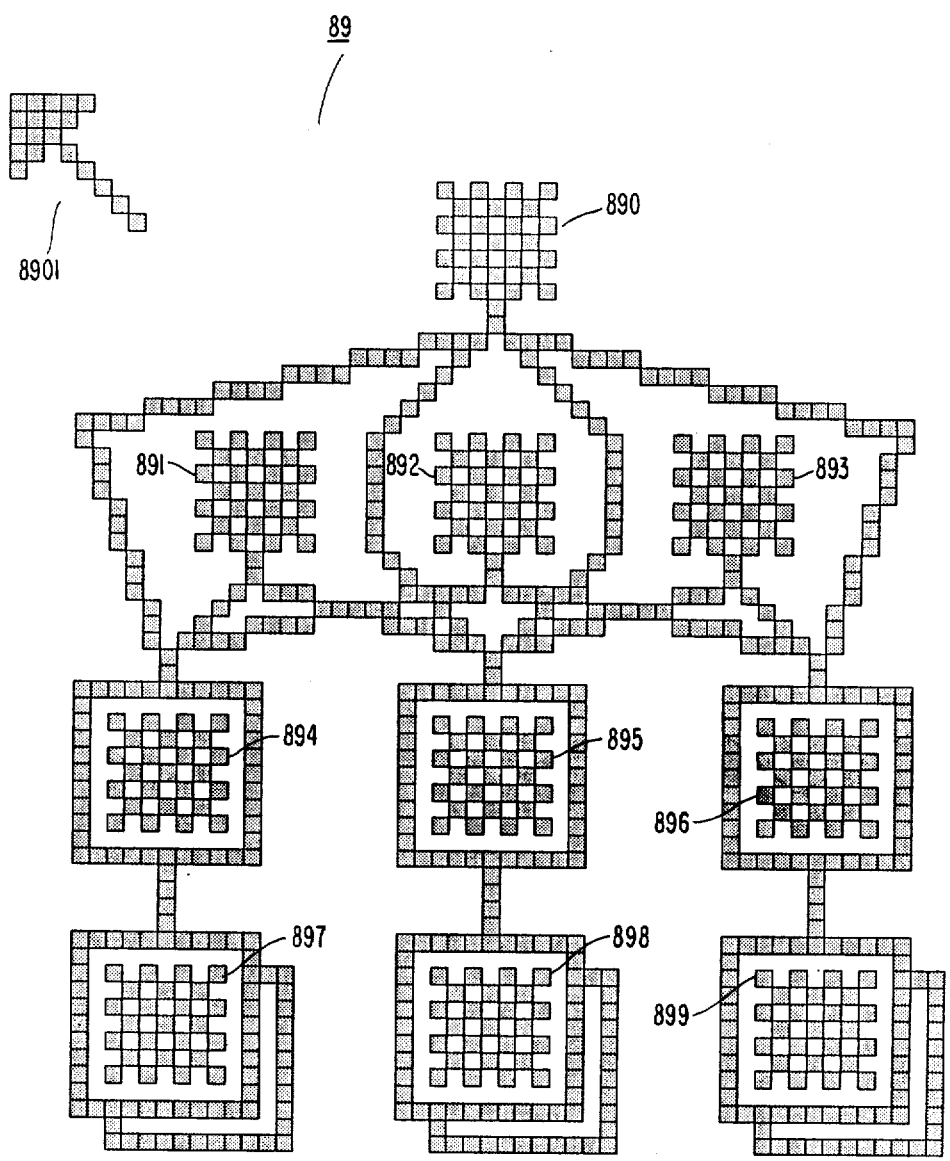
FIG. 29 depicts a cursor design for a threebutton chording mouse, capable of distinguishing singleclicks from rapid double-clicks, with decoupled pointer and image regions, in accordance with the present invention.
Figure 30:
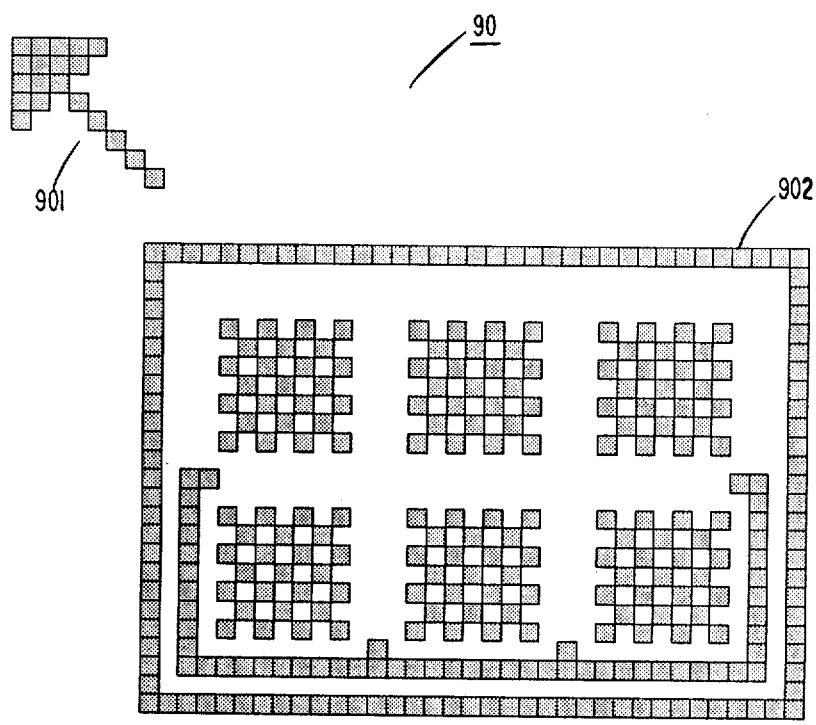
FIG. 30 depicts a cursor design for a threebutton mouse, capable of distinguishing single-clicks from rapid double-clicks, but incapable of chording, with decoupled pointer and image regions, in accordance with the present invention.

Other partitions of function are also possible under this invention. FIG. 28 shows the pointer region 881 and image region 882 for a cursor utilized with a two-button mouse in which no chords are permitted. The user can access only two operations: one associated with the left mouse button, and one associated with the right mouse button (i.e., "chords" "L" and "R" respectively). FIG. 29 depicts a cursor image 89 which responds both to singleclicks and to rapid double-clicks (but not to multi-key chords) on each button of a three-button mouse (the bottommost row of icon 897–899 is used to represent the doubleclick operations). FIG. 30 depicts a version 90 of the cursor of FIG. 27 which is sensitive to single-clicks and double-clicks, but not to chords.

In FIGS. 27 and 29, the method of operation is the same as that for the preceding materials, except that the user may now input chords in addition to single-clicks and double-clicks. The pointer region is positioned over the desired computer operation in a menu of operations.

The user inputs the chord to be used to invoke that operation. The operation is then associated by the computer system with the chord. The icon for that operation is overlaid onto the cursor image in the icon subregion corresponding to the chord. The pointer region can then be positioned over a data object. The user inputs the chord associated with the desired computer operation in order to cause the system to execute that operation upon the data object.

A further departure from the art occurs in the process of displaying the image portion of the cursor. It is undesirable to move a large image such as image 871 FIG. 27 around the screen whenever the mouse is moved. In accordance with one illustrative embodiment, a simple operational rule is adopted: When the user begins to move the mouse, the system makes the image region invisible. The pointer region remains visible and tracks the movement of the mouse. When the mouse has ceased movement for an assignable delay period, the image region is made visible again. (The delay interval before the image region is displayed will be discussed below.)

Thus, under this invention, movement and display of the two regions of the cursor—the pointer region and the image region—are deliberately uncoupled from one another in time and space. The pointer region and the image region may be displayed at different moments in time. They may be displayed in different spatial locations, or in different spatial relationships to one another. For example, it is supposed that the default is that the image region is usually displayed to the right of the pointer region; in the event that the data object is at the extreme right of the screen, then the image region would be displayed to the left of the pointer region to insure visibility of the image region. The two regions function as a single cursor despite this uncoupling.

Another departure from the art occurs in the process of loading functions into the cursor and of executing those functions on data objects. In the simplest case, the inexperienced user positions the pointing region and waits for the image region to be displayed. Once the image region has appeared, the user chooses the correct chord and inputs it through the mouse. However, under this invention it is also possible for an experienced user to act while the image region is invisible—i.e., to input the remembered chord before the delay interval has completed and the image region has been displayed.

This constitutes a third type of decoupling: access to functionality (i.e., ability to execute an operation) is decoupled from visibility of cues to that functionality (i.e., display status of image region). This is quite different from functionality accessed through conventional pop-up menus, in which the menu(s) must be traversed to access the functionality.

Figure 31:
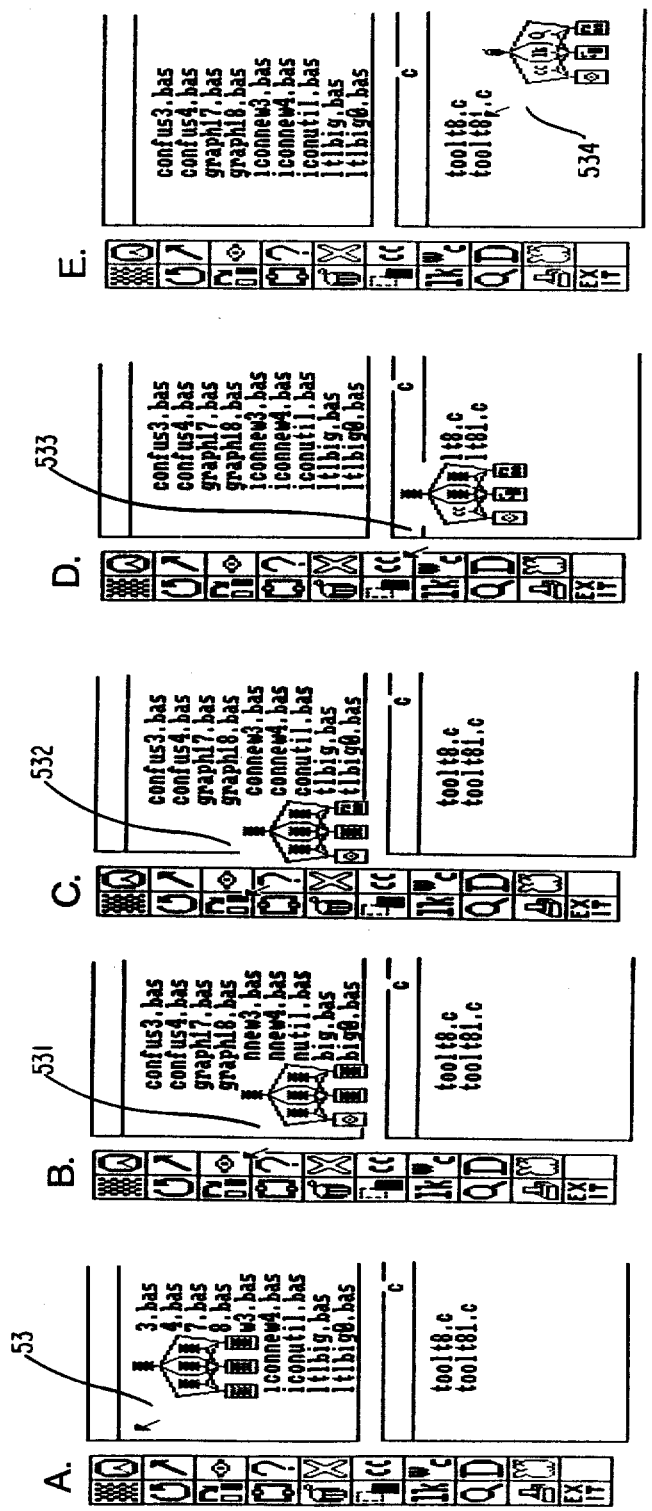
FIG. 31 depicts a sequence of mouse-clicking operations to load a number of operations into seven chords for a three-button mouse.

Reference is now made to FIG. 31, to review how functions are assigned to the mouse chords and how the assigned functions operate on data objects, under the newly described decoupling capabilities. In the illustrative embodiment, a menu of operations is placed on a subarea of the screen. An exemplary menu is shown in column A of FIG. 31 as represented by the corresponding icons. Also shown in column A of FIG. 31, to the right of the menu, is cursor shape 53 discussed as shape 87 with respect to FIG. 27. To select a desired operation, the user moves the pointer region over that operation and inputs the desired chord to associate with that operation. As shown in column B of FIG. 31, the pointer region is placed over the "edit" icon, and then the left button (i.e., the chord "L") is input. The "edit" icon appears in shape 531 in the lower left image subregion of the image region (i.e., the subregion corresponding to the "L" chord). Similarly, column C of FIG. 31 shows the user loading the "rename"operation into the right mouse button (i.e., the chord "R"); its icon appears in shape 532 in the lower right icon subregion of the image region. After the "copy" icon has been loaded into the middle button (chord "M"), column D of FIG. 31 shows the user loading the "c compiler"("cc" icon) into the "LM" chord (the right side of the middle row), as depicted by shape 533. The "link" ("lk" icon) and "debug" (magnifying glass icon) are then loaded into chords "LR" and "MR" respectively. Finally the "trash can" (delete) icon is loaded into the "LMR" chord. The user is then ready to perform operations on files—such as the file "toolt81.c"—as depicted in column E of FIG. 31 by shape 534. (It should be understood that a partially-loaded image can also be used effectively.)

FLOW DIAGRAM DESCRIPTION

For ease of presentation, this description assumes a multiple-button mouse with single-click, double-click, and multiple-button chord protocols; all mouse button inputs will be called "chords" generically. The process can be applied by one skilled in the art to mice with other arrangements of buttons, to other click and chord protocols, and to other pointing devices.

DECOUPLING OF POINTER REGION AND IMAGE REGION IN TIME

Figure 32:
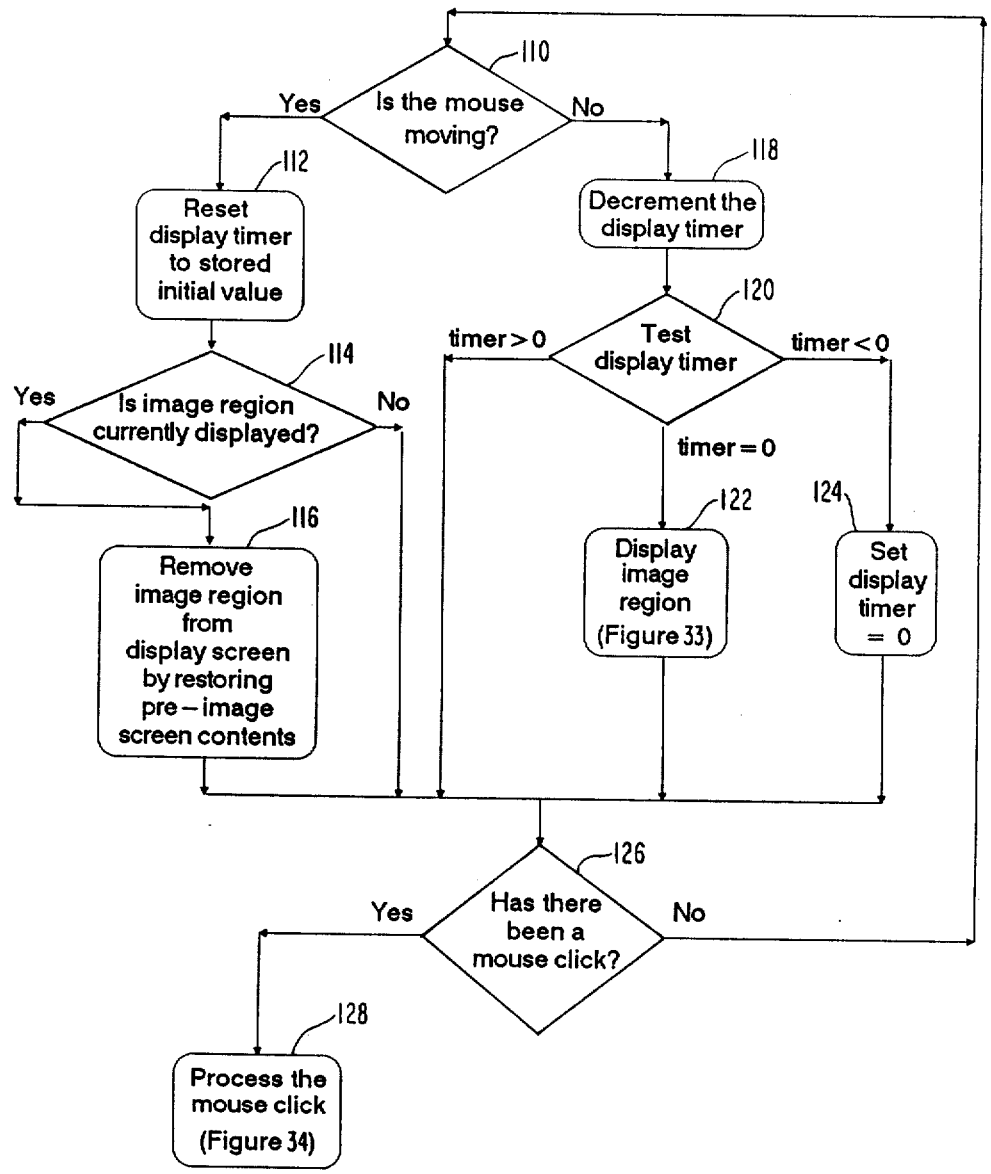
FIG. 32 depicts a flow diagram for the portion of multifunctional cursor processing which decouples pointer and image functionalities in time.

FIG. 32 depicts the portion of the multifunctional cursor processing which decouples the pointer and image functionalities in time. The default state of the process is to determine if the mouse has moved since the last time the state of the mouse was queried, as in block 110. A "display timer" is used to determine whether the image region should be displayed. If mouse movement has occurred, the display timer is reset to a stored initial value (block 112), and if the image region is currently displayed (tested in block 114), then its image is removed through being replaced with the screen contents which had been visible before the image region was displayed (block 116).

If no mouse movement has occurred, the system decrements the display timer, as in block 118, and then tests the resulting display timer value (block 120). If the timer value is positive, no display action is taken. If the timer value is zero, this is the trigger to cause the image region to be displayed, as is done by block 122 (detailed flow of the image region display process is given in FIG. 33, which is discussed below). If the timer is less than zero, its value is reset to zero to prevent an extremely negative number from wrapping around to positive (block 124).

The continuous display of the pointer region with the intermittent display of the image region constitutes the decoupling in time.

After all possible actions relating to mouse movement are completed, the system tests to determine if the user has chorded the mouse (block 126). If there has been a mouse chord, the system processes the mouse input (block 128 and FIG. 33). If there has been no mouse input, the system returns to test for mouse movement (block 110).

The stored initial value for the display timer may be made accessible for modification by other system processes, such as error-detection software or usermodeling software.

DECOUPLING OF POINTER REGION AND IMAGE REGION IN SPACE

Figure 33:
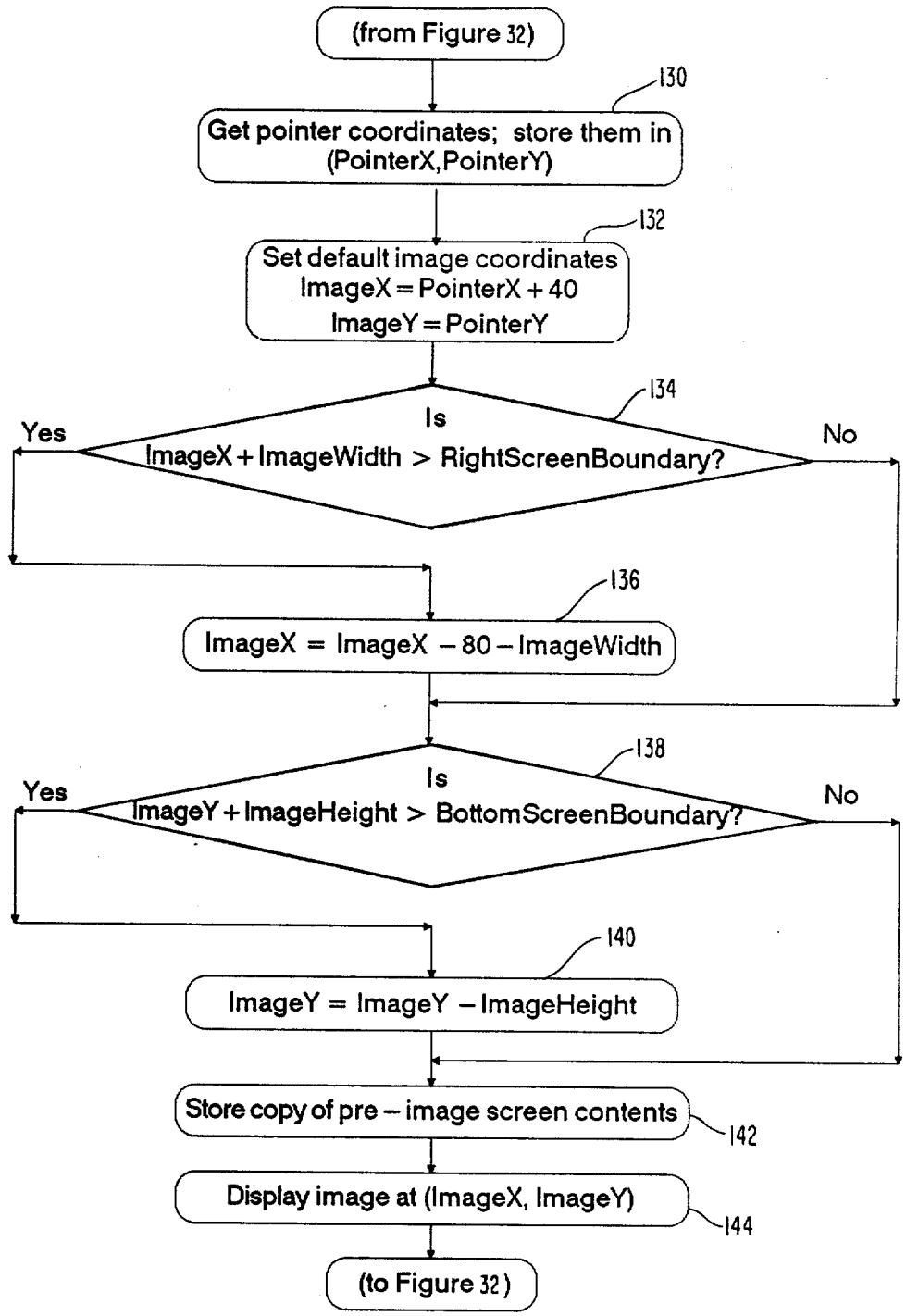
FIG. 33 depicts a flow diagram for the portion of multifunctional cursor processing which decouples pointer and image functionalities in space.

FIG. 33 depicts the portion of the multifunctional cursor processing which decouples the pointer and image functionalities in space. This is reached from block 122 of FIG. 32. This portion of the discussion assumes that screen locations are represented as (horizontal coordinate, vertical coordinate) pairs. The point (0, 0) is assumed to be the the upper left corner of the screen, and the point (RightScreenBoundary, BottomScreenBoundary) is assumed to the lower right corner. The image region has the dimensions ImageWidth by ImageHeight. The pointer region is considered to have as its position the coordinates of its hot spot—i.e., the tip of the arrow of FIGS. 27, 28, 29, 30, 31, and the intersection of the cross-hair of FIG. 2. The image region is considered to have as its position the coordinates of its upper left corner.

The default relative spatial location of the image region is as follows: the image horizontal position is an offset from the pointer horizontal position; and the image vertical position is the same as the pointer vertical position. This default relative spatial location may be modified to insure the visibility of the image region; such modification constitutes the decoupling of pointer region and image region in space.

The process begins by querying the mouse software to obtain the coordinates of the current location of the pointer hot spot (block 130). These are assigned to the variables PointerX and PointerY. The default coordinates for the upper left corner of the display of the image region (ImageX, ImageY) are next calculated as shown in block 132.

The process then protects against errors by testing whether the right margin of the image region (ImageX+ImageWidth) would if displayed fall beyond the right margin of the screen (RightScreenBoundary), as determined in block 134. If this error would occur, then the error is avoided by resetting ImageX (block 136).

Similarly, the process protects against errors by testing whether the bottom margin of the image region (ImageY+ImageHeight) would if displayed fall below the bottom margin of the screen (BottomScreenBoundary), as determined in block 138. If this error would occur, then the error is avoided by resetting ImageY (block 140).

A copy is made of the pre-image contents of the screen in the area defined by (ImageX, ImageY) and (ImageX+ ImageWidth, ImageY+ImageHeight). This is the area which will be overwritten by the image (block 142).

Finally, the image is displayed at (ImageX, ImageY) (block 144).

CHORD PROCESSING AND DECOUPLING OF VISIBILITY AND ACCESSIBILITY

Figure 34:
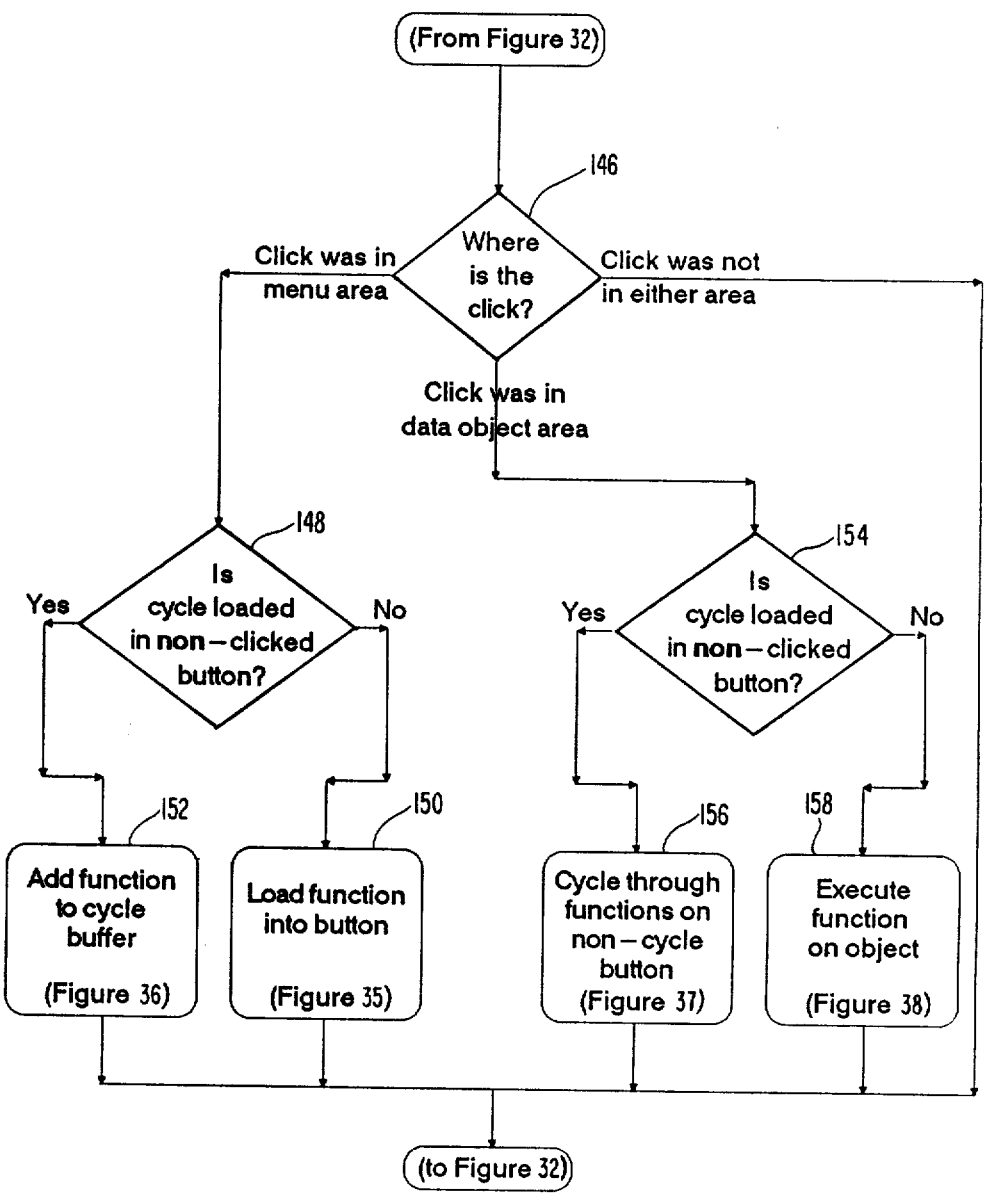
FIG. 34 depicts an overview flow diagram for the remaining aspects of multifunctional cursor processing (processing mouse clicks and chords)

FIG. 34 depicts an overview of mouse chord processing, which is reached from the test of whether a mouse chord occurred in FIG. 32 (block 126, which leads to block 128). It should be noted that control reaches this point regardless of whether the image region is currently visible. This fact constitutes the decoupling of visibility of image region from accessibility to the operations loaded into that image region.

The system tests (block 146) to determine whether the chord occurred when the pointer hot spot was in the menu area, the data object area, or neither area. If the chord occurred with the pointer hot spot in the menu area, then the system checks to determine if the cycle function has already been loaded in one of the chords other than the chord which was just entered, as per decision block 148. If not, then the selected operation is loaded into the mouse software and the icon for the selected operation is loaded into the appropriate subregion of the image region (block 150 and FIG. 35). If so, then the operation which was selected by the current chord is added to the ring buffer for the cycle function (block 152) on the currently entered chord, as will be described in more detail with reference to FIG. 36.

If the chord occurred with the pointer hot spot in the data object area, then the system checks whether the chord which was entered has the cycle function loaded into it, as per block 154. (This is similar to the preceding processing by block 148, except that in the preceding case the question concerned the non-chorded buttons, whereas in the current check the question concerns the chorded button.) If the answer is yes—i.e., if the user has chorded on the cycle function—then the process moves through a ring buffer of loaded operations, as per block 156 and FIG. 37, discussed below. If the chorded function is not the cycle function, then the process performs the operation associated with the mouse chord upon a data object (block 158 and FIG. 38).

If the chord occurred in neither area, then control returns to the mouse movement test of FIG. 32 (block 110).

LOAD OPERATION INTO MOUSE SOFTWARE

Figure 35:
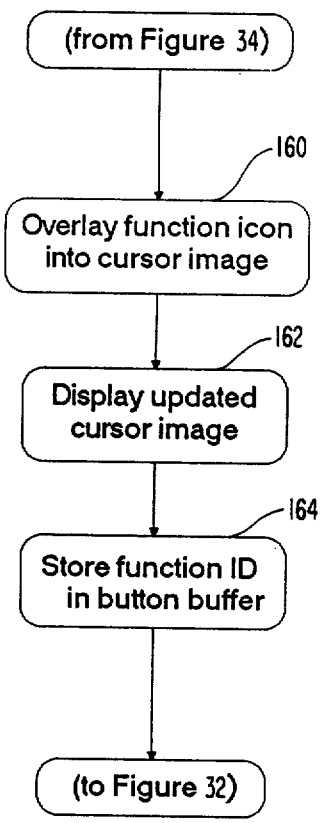
FIGS. 35, 36, 37, and 38 depict detailed flow diagrams corresponding to decision points within the overview flow diagram of FIG. 34.

If in the overview flow (FIG. 34), the chord occurred in the menu area and there was no cycle operation loaded into any of the image subregions, then the steps depicted in FIG. 35 are followed to load the chordselected function into the mouse software.

The image subregion corresponding to the mouse chord is overlaid with the operation icon corresponding to the operation which was selected (block 160). The updated image region is displayed (block 162). The function's ID is stored in the input pattern buffer for the chord (block 164). Finally, the process returns to the mouse movement detection state of FIG. 32 (block 11O).

ADD FUNCTION TO CYCLE BUFFER

Figure 36:
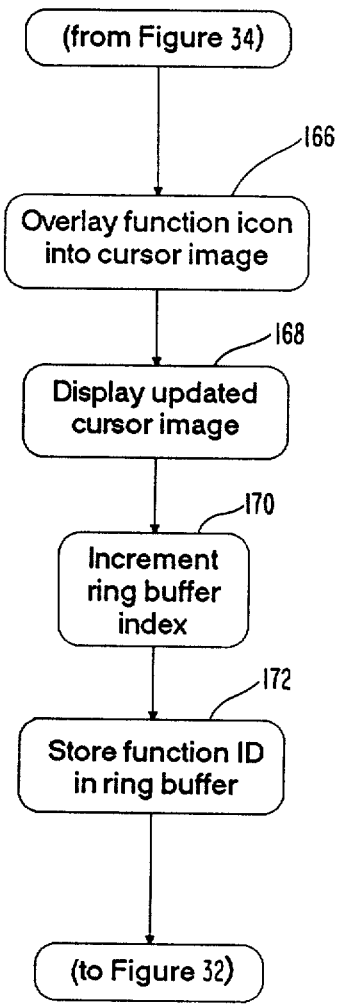

If in the overview flow (FIG. 34), the chord occurred in the menu area and the cycle operation had been loaded in a non-chorded image subregion, then the steps depicted in FIG. 36 are followed to add the chord-selected function into the cycle ring buffer. A separate ring buffer is maintained for each chord (i.e., for each image subregion); a single index is used for all ring buffers.

The image subregion corresponding to the mouse chord is overlaid with the operation icon corresponding to the operation which was selected (block 166). The updated image region is displayed (block 168). The ring buffer index is incremented (block 170), and the function's ID is stored in the input pattern buffer for the chord (block 172). Finally, the process returns to the mouse movement detection state of FIG. 32 (block 110).

CYCLE THROUGH FUNCTIONS ASSOCIATED WITH NON-CYCLE CHORDS

Figure 37:
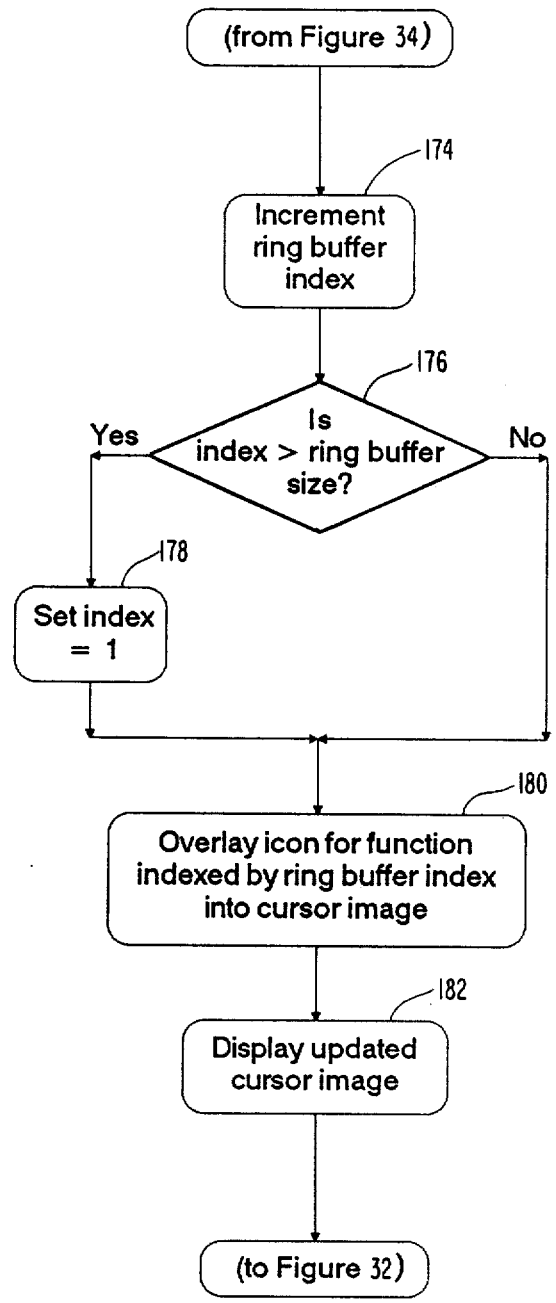

If in the overview flow (FIG. 34), the chord occurred in the data object area and the chorded operation was the cycle operation, then the steps depicted in FIG. 37 are followed to cycle through the functions on the non-cycle chords.

The ring buffer index is incremented (block 174). If the index is now greater than the size of the ring buffer (block 176), then it is reset to the initial position in that buffer (block 178). For each image subregion, the icon corresponding to the function ID in each indexed ring buffer position is overlaid onto the corresponding non-cycle image icon subregions (block 180). The display of the image region is updated with this new image (block 182). The process then returns to the mouse movement detection state of FIG. 32 (block 110).

EXECUTE OPERATION ON OBJECT

Figure 38:
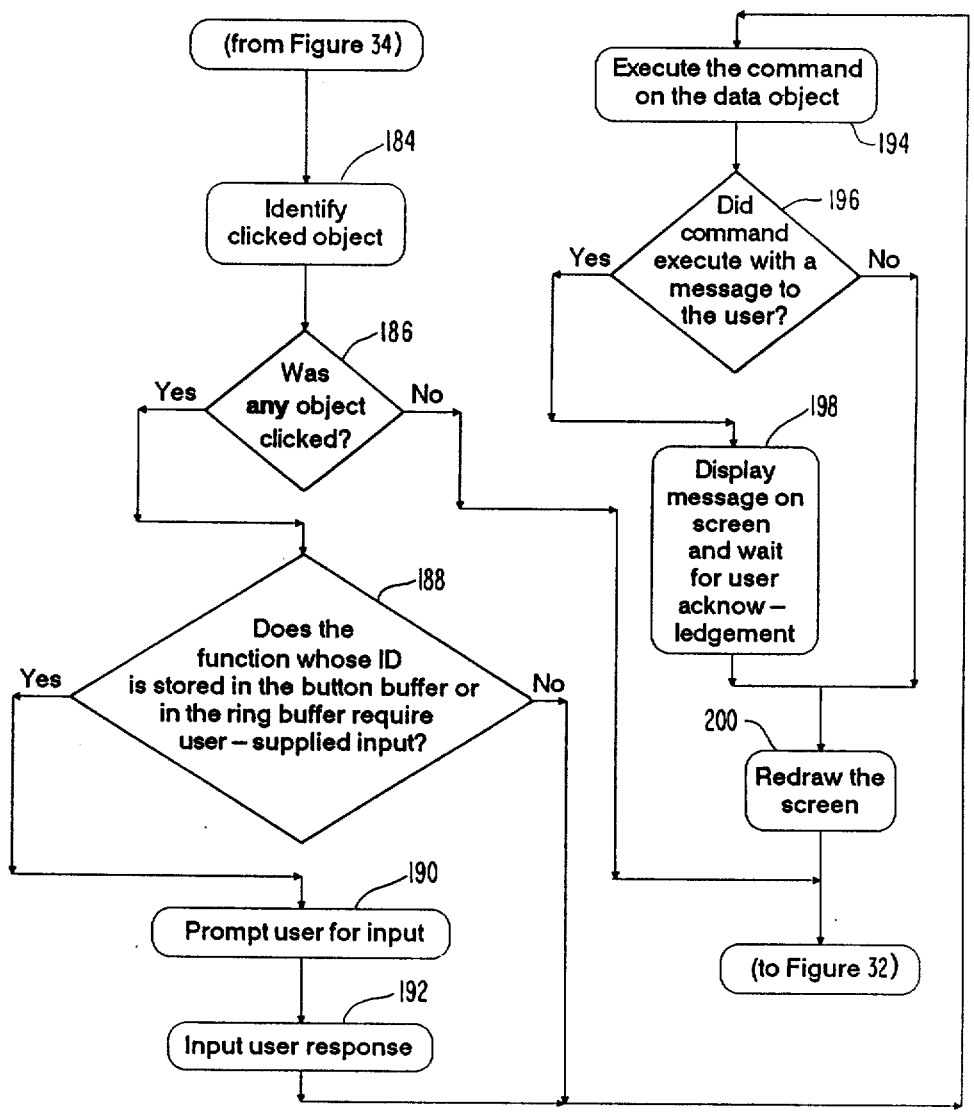

If in the overview flow (FIG. 34), the chord occurred in the data object area and the chorded operation was not the cycle operation, then the steps depicted in FIG. 38 are followed to execute the previously-loaded operation on the data object.

The process begins by identifying which data object was chord-selected (block 184)—i.e., which data object was pointed at by the pointer region of the cursor. If the chord fell on an empty portion of the data object region (block 186), then the process returns to the mouse movement detection state of FIG. 32 (block 110).

If the chord fell on a data object, then the process checks to determine if the function ID in the input pattern buffer requires user-supplied parameters (block 188). If so, the process prompts the user for the parameter(s) (block 190) and inputs the user's response (block 192).

The command is then executed on the data object (block 194). If the command completed with a message to the user (block 196), then that message is displayed on the screen until the user acknowledges that the message has been seen (block 198). The screen is redrawn (block 200), and the process returns to the mouse movement detection state of FIG. 32 (block 110).

It is to be understood that the above-described embodiment is simply illustrative of the application of the principles in accordance with the present invention. Other embodiments may be readily devised by those skilled in the art which may embody the principles in spirit and scope.

What is claimed is:

1. A method for operating an interactive computer system having a memory, a screen display serving as a user interface, and a device to control movement of information on the screen and to communicate the information associated with the screen to the system, said method comprising the steps of assigning a first area of the memory which corresponds to a movable region of the screen to display a pointer region, wherein said pointer region is movable about the screen display by changing the contents of the memory under control of the user, assigning a second area of the memory which corresponds to a relocatable region of the region, decoupled from said pointer region, to display an image region, wherein said image region is movable about the screen display by changing the contents of the memory under control of the user, displaying a pointer in said pointer region, selecting a computer operation from a menu list of computer operations displayed on the screen display by moving said pointer to said computer operation on said menu list and executing a user-invoked select-event and storing said selected operation in the memory for later recall, wherein said operation, when recalled and invoked by the user, activates said selected computer operation for computer processing of a data object displayed on the screen and pointed at by said pointer, said step of selecting including the steps of positioning, under control of the device, said pointer region onto one of the said operations to select said operation, and transmitting an image icon from the system to the screen in response to operating the device to acknowledge the selection of said operation, saving, as predetermined screen contents, the contents of the screen prior to any display of said image region, displaying the image icon in said image region by presenting both said image region and said image icon on the screen after an assignable time interval following cessation of any movement of the device, and displaying said predetermined screen contents during movement of the device.

2. A method for operating an interactive computer system having a memory, a screen display serving as a user interface, and a device to control movement of information on the screen and to communicate the information associated with the screen to the system, said method comprising the steps of assigning a first area of the memory which corresponds to a movable region of the screen to display a pointer region, wherein said pointer region is movable about the screen display by changing the contents of the memory under control of the user, assigning a second area of the memory which corresponds to a relocatable region of the screen, decoupled from said pointer region, to display an image region and subdividing said image region into a plurality of image subregions, wherein said image region is movable about the screen display by changing the contents of the memory under control of the user, displaying a pointer in said pointer region, selecting, for each of said image subregions, a computer operation from a menu list of computer operations displayed on the screen display by moving said pointer to said computer operation on said menu list and executing a user-invoked select-event and storing said selected operation in the memory for later recall, wherein said operation, when recalled and invoked by the user, activates said selected computer operation for computer processing a data object displayed on the screen and pointed at by said pointer, said step of selecting including the steps of positioning, under control of the device, said pointer region onto one of said operations to select said operation, and transmitting an image icon from the system to the screen in response to operating the device to acknowledge the selection of said operation, saving, as predetermined screen contents, the contents of the screen prior to any display of said image region, displaying each said image icon in corresponding ones of said image subregions by presenting said image region and each said image icon on the screen after an assignable time interval following cessation of any movement of the device, and displaying said predetermined screen contents during movement of the device.

3. The method as recited in claim 2 wherein said step of displaying each said image icon further includes the steps of choosing the screen location of said image region according to defaults and screen boundaries for visibility of said image region, and writing said image region to the screen at said chosen screen location.

4. In a computer system having a memory and a terminal display area for displaying input/output information provided by a user of the system and wherein selected input information is provided to the system through a pointer display subarea movable about the display area under the control of a mouse-driven interface, the method comprising the steps of defining an area of the memory which corresponds to a relocatable image display subarea decoupled from said pointer subarea, wherein said image subarea is movable about the terminal display by changing the contents of said memory area under control of the user, associating another area of the memory which corresponds to a pointer icon with said pointer subarea and displaying said pointer icon in said pointer subarea, selecting a computer system operation from a menu list of computer operations displayed on the terminal display by moving said pointer icon to said computer operation on said menu list and executing a user-invoked select-event and storing said selected operation in the memory for later recall, wherein said selected operation, when recalled and invoked by the user, activates said selected computer operation for computer processing of a data object displayed on the terminal display and pointed at by said pointer icon, transmitting an image icon from the system to the terminal display in response to operating the mouse driver to acknowledge the selection of said operation, saving, as predetermined display area contents, the contents of the terminal display area prior to any display of said image display subarea, displaying said image icon in said image display subarea by presenting said image subarea in the display area after an assignable time interval following cessation of movement of the mouse driver, and wherein one component of the selected input information is said assignable time interval, and displaying said predetermined display are contents during movement of the mouse driver.

5. The method as recited in claim 4 wherein said step of displaying said image icon further includes the steps of choosing the display area location of said image subarea according to defaults and display area boundaries so as to insure visibility of said image subarea, and writing said image subarea to said display area at said chosen display are location.

* * * * *

UNITED STATES PATENT AND TRADEMARK OFFICE
CERTIFICATE OF CORRECTION

PATENT NO. : 4,984,152
DATED : January 8, 1991
INVENTOR(S) : Michael J. Muller

It is certified that error appears in the above-indentified patent and that said Letters Patent is hereby corrected as shown below:

In the Abstract, change "themselves by cycled" to --themselves be cycled--.

Column 7, line 36, change "icon 702" to --icon 703--.

Column 10, line 19, change "as essentially" to --has essentially--.

Column 14, line 36, change "ooccurred" to --occurred--.

Column 18, line 25, in claim 4, change "display are contents" to --display area contents--.

Column 18, line 35, in claim 5, change "are location" to --area location--.

Signed and Sealed this

Eighth Day of February, 1994

Attest:

BRUCE LEHMAN

*Attesting Officer*     *Commissioner of Patents and Trademarks*